INVENTORS
M.L. FRANKLIN
D.W. GAGLE

BY

ATTORNEYS

3,557,491
SEED GERMINATION STRUCTURE
Marvin L. Franklin and Duane W. Gagle, Bartlesville, Okla., assignors to Phillips Petroleum Company, a corporation of Delaware
Filed July 25, 1968, Ser. No. 747,581
Int. Cl. A01c 1/04
U.S. Cl. 47—56                            7 Claims

ABSTRACT OF THE DISCLOSURE

A permeable fabric or film, e.g., a non-woven polyolefin such as polypropylene, is treated on one side with a carrier containing seed and comprising a water-soluble material or gum, e.g., carboxymethylcellulose. A filler, e.g. subdivided cellulose and/or a fertilizer, e.g., ammonium nitrate, can be incorporated into the carrier. The other side of the fabric or film is coated with asphalt applied as a dilute emulsion wash, or the fabric can be at least partially saturated with asphalt. The thus treated fabric or film is placed seed treated side down on and can be fastened to the ground to produce accelerated seed germination and growth and to protect against erosion until a desired stand of ground cover has been grown. When degradation of the fabric or film is desired, it can be chosen to be an ultraviolet degradable material, e.g., unpigmented polypropylene. By varying the amount and/or dilution of asphalt or of asphalt emulsion or other material combined with the film or fabric selected periods of time of slope reinforcement can be obtained. A radiant heat absorbent material, e.g., a dark pigment, such as carbon black, can be incorporated into the asphalt or similar wash.

SEED GERMINATION STRUCTURE

Figure 1:
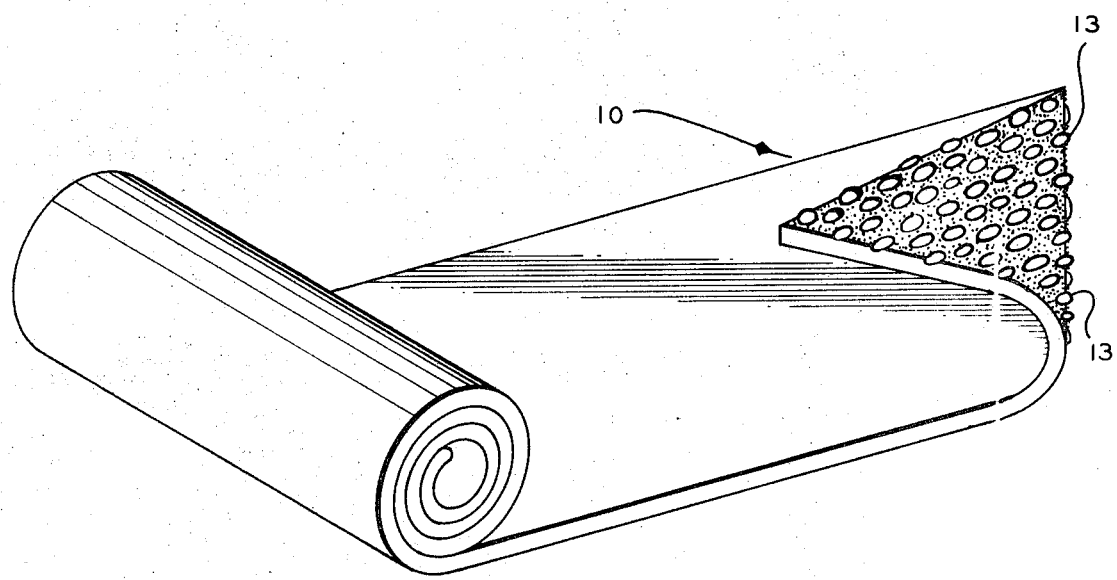

This invention relates to a seed germination structure. It also relates to a method of protecting for a period of time an unplanted area of ground, for example, a slope along a highway.

In one of its concepts the invention provides a seed germination structure composed of a permeable fabric or film treated on one side with a water soluble carrier containing seed and comprising in a preferred form a filler and/or a fertilizer and/or a radiant heat absorbent material. In one of its now preferred more specific concepts, the invention provides a seed germination structure composed of a non-woven polyolefin fabric, e.g., polypropylene, treated on one side with a carrier containing seed, the carrier comprising a water soluble material or gum, e.g., carboxymethylcellulose. In another of its concepts the invention provides such a structure adapted to be laid treated side containing seed down on the ground, the upper side of the structure being sprayed or otherwise treated with a desired amount of a protective coating selected to last a predetermined time and to have been substantially degraded thereafter. In another of its concepts the invention provides for selected amounts of coating on the top side of the structure to permit degradation of the polyolefin or other degradable substance of which the structure itself is composed.

In U.S. Pat. 3,160,986, issued Dec. 15, 1964, there is disclosed the use of a polyethylene film to which has been secured by a water soluble adhesive seeds it is desired to germinate. Briefly, the film disclosed is a polyethylene film ranging in thickness from 1 to 6 mils. After use this film is removed. The film is described as permitting a gaseous transfer to maintain physiological balance required to grow the seed under the film, the gaseous transfer occurring either through the film or under the edges thereof.

We have now found that the use of a permeable film or fabric, as herein described, avoids the need for its removal and can be used for a very long time to provide a mulch and erosion protectant.

An object of the present invention is to provide a seed germination structure. Another object of the invention is to provide a soil erosion protectant. A further object of the invention is to provide a seed germination structure which need not be removed from the soil or ground. Further, it is an object of the invention to provide a seed germination structure of a character such that it will degrade over a desired selected period of time. Further still, it is an object of the invention to provide such a structure which is adapted to absorb radiated heat so as to accelerate seed germination and growth. Indeed, another object of the invention is to provide such a structure of self-degrading material, the structure being so composed as to regulate the effective life of the structure. Further still, it is an object of this invention to provide a self-degrading seed germination structure in which at least one component will regulate a self-degrading component in the structure.

Other aspects, concepts, and objects of the invention are apparent from a study of this disclosure, the drawing, and the appended claims.

According to the present invention there is provided a seed germination structure which will protect areas subject to erosion over a period of time necessary for and to obtain accelerated seed germination and growth, the structure comprising a permeable plastic film or fabric incorporating a seed and/or nutrient materials and/or a filler on one side thereof and in a preferred form on the other side thereof, a layer of adjustable light penetration properties as further described herein.

The plastic film or fabric used in the structure of the invention can be a polyolefin such as polypropylene and can be used in the form of a permeable film or fabric, e.g., non-woven polypropylene fabric, polyvinyl chloride, nylon, polyethylene, fiber glass, and the like which have been prepared in one of a number of woven, tufted, rolled, or extruded configuration which are used as backing for a water soluble carrier incorporating seed and/or nutrient and/or filler and preferably treated as herein described to regulate access of ultraviolet light thereto.

In one form of the invention a non-woven polypropylene fabric such as "Loktuft" (a trademark) is covered on side with a seed carrier which is a water soluble gum such as carboxymethylcellulose containing selected fertilizing formulations and filler. The seed carrier side is the side laid on the ground. The other side of the Loktuft fabric is treated with a cut back asphalt or an asphalt emulsion of a dilution such that the weather-exposed surface of the material when laid on the ground will provide the degradation of the Loktuft over a period of time. It will be understood by those skilled in the art of preparing non-woven fabric, e.g., polypropylene fabric, that for the purposes of this invention, the fabric will preferably not contain anti-degradation pigments or protectants, except as these may be useful to provide the desired effective time and/or to coact with the asphalt emulsion to provide such time. Thus, while in one form of the invention, to produce earlier germination, the plastic fabric will incorporate a carbon black or other suitable dark pigmentation, this pigmentation can be considerably reduced or eliminated and the unpigmented polypropylene, when it is the material used or whatever other material is used, can be treated by a dilutable asphalt emulsion wash to regulate its time of degradation. A degradable coating, in lieu of the asphalt emulsion, would be a polyolefin emulsion sprayed on the fabric. This would be so regardless of the chemical composition of the fabric per se.

Certain fabrics, including those made of polypropylene, tend to degrade due to sunlight and other factors. Various pigments added to the material decrease disintegration. Asphaltic material is particularly good in minimizing degradation of the plastics. The life of the fabric can be lengthened by addition of pigments, e.g., carbon black, and by the asphaltic material application to the material. In some operations, degradation of the fabric is desired. In other operations, minimum degradation of the fabric is desired. This can be regulated by the amount and types of pigments used and/or amount of asphalt used.

Thus, the carbon black can be incorporated into the structure by adding the carbon black to the asphalt. Thus, there is contained in the structure an anti-degradation protectant in an amount effective to regulate to a desired extent the time taken for the structure to degrade.

The fabric can be pre-formed and shipped in rolls. That is, the asphalt treatment, adhesive treatment, and seed application thereto can be carried out in a manufacturing plant, and the rolls shipped to an area for application. A partially formed material (no asphalt) can also be pre-prepared and shipped. At the site of usage, this latter material is rolled out and asphalt emulsion is applied thereto.

The thickness of the permeable fabric or film can be in the range of 0.01 millimeter to about 5 millimeters, depending on the porosity of the fabric. Usually, when a more porous material is used, the thickness is greater.

On a square yard of fabric basis:

| | Normal range |
|---|---|
| Pounds of asphalt [1]/square yard | 0.001–1 |
| Pounds of fertilizer, e.g., $(NH_4)_2SO_4$/sq. yd. | 0.005–0.1 |
| Pound of adhesive (e.g., carboxymethylcellulose) [2] sq. yd. | 0.001–5 |
| Seed e.g., Bermuda grass) seeds/sq. in. | 5–50 |

[1] The asphalt can be a cut-back asphalt road oil or an asphalt-aqueous emulsion, known in the art. The conventional aqueous-asphalt emulsions generally have about 60 to 70 percent asphalt. The emulsion can be further diluted to about 5 percent asphalt, using water, and applied in this manner to the membrane.

[2] The gum, such as CMC (carboxymethylcellulose) is water soluble and can be made up in any usable strength (for ease of application). Usually 2 to 15 weight percent strengths of CMC in water are usually employed.

Figure 2:
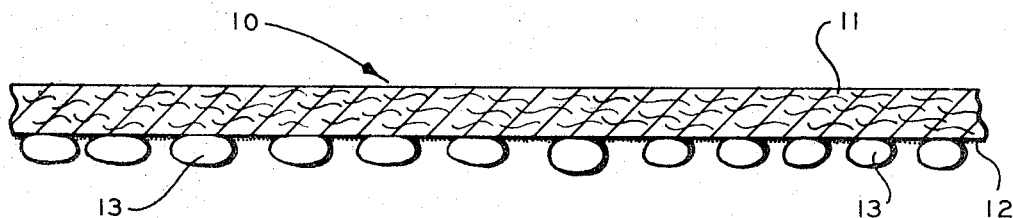
Figure 3:
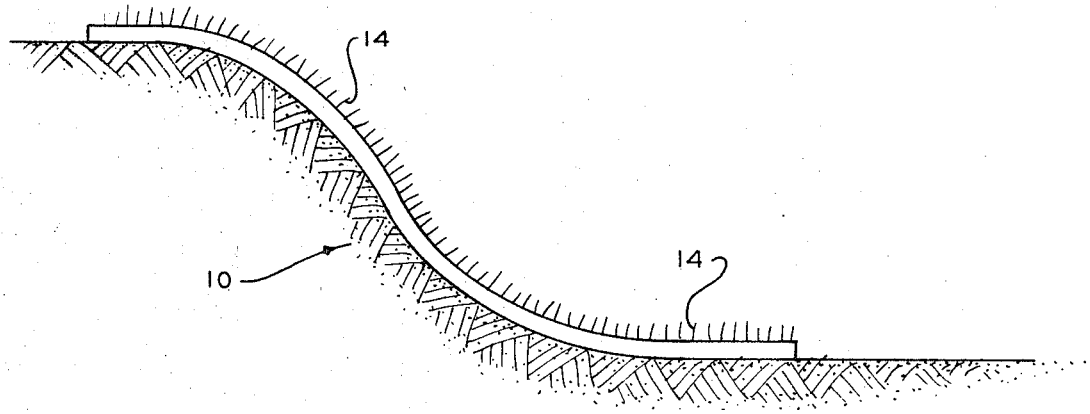

The three figures in the drawing illustrate the invention. FIG. 1 shows a pre-formed roll of the material of the invention being partially unrolled with the end flap raised to show the seedside which faces the ground. FIG. 2 is a cross-sectional view of the material laid on the ground. FIG. 3 illustrates the material on a slope after the seeds have germinated, and grass has grown through the fabric.

In the figures, like numbers represent the same components. Numeral 10 represents the material in general. Numeral 11 represents the asphalt-impregnated fabric, 12 represents the adhesive plus a fertilizer (optional), 13 represents the seeds, and 14 represents grass having grown after application of the material to the soil.

EXAMPLE

A polypropylene non-woven fabric was treated on one side with an application of carboxymethylcellulose, ammonium sulphate and Bermuda grass seed.

The Loktuft having the physical properties as herein described was substantially coated with asphalt but only to an extent as to leave pin holes which could be observed when the treated fabric was held up to the light. The thickness of the treated fabric, including the gum and the seed, was of the order of about 1.5 millimeter.

In the specific test, the following materials were used:

| | |
|---|---|
| Thickness of Loktuft [1] fabric, millimeters | About 1 |
| Pounds of asphalt [2] sq. yard fabric | 0.003 |
| Pigmentation | None |
| Pounds CMC [3] sq. yard fabric | 0.002 |
| Pounds $(NH_4)_2SO_4$ [4] sq. yard fabric | 0.02 |
| Bermuda grass seed, seeds/in.$^2$ | About 10 |

[1] "Loktuft" is a non-woven fabric of polypropylene fibers and is available from Revonah Spinning Mills, Trenton and Castor Avenues, Philadelphia, Pa. "Loktuft" is available in rolls of about six feet width and lengths of 200 to 300 feet. "Loktuft" has a weight of about two to six ounces per square yard. "Loktuft" holds about four times as much asphalt as do burlap mats, cotton fibers, woven cloth, etc.

[2] The asphalt emulsion was the cationic emulsion as disclosed in U.S. Pat. 3,093,595, but cut back with additional water to have about 5 weight percent asphalt therein.

[3] The carboxymethylcellulose was a water solution having about 5 weight percent CMC therein.

[4] The ammonium sulfate fertilizer was dissolved in the CMC solution.

The fabric was sprayed on one side with the CMC-ammonium sulfate solution; and the Bermuda seeds were aded therto. This material, after being allowed to "set," was laid seed-side down on the ground, and the asphalt emulsion was applied thereto.

Upon application to the ground, the thus treated Loktuft fabric produced germination and direct growth through the asphalt treated fabric. There was no need to remove the fabric for continued excellent growth, thus assuring continued protection against erosion.

Other polyolefins or copolymers as are prepared in U.S. Pat. No. 2,825,721, issued Mar. 4, 1958, John Paul Hogan and Robert L. Banks, the disclosure of which is incorporated herein by reference, are suitable for preparing the film or fabric used according to the present invention.

Herein and in the claims the terms "plastic film" and "plastic fabric" are to be understood to mean materials which are of plastic and are suitable for producing the moisture permeable structure of the invention. Thus, whether a permeable film of plastic or a permeable fabric of plastic is used these are considered to be functionally equivalent for purposes of the invention.

Reasonable variation and modification are possible within the scope of the foregoing disclosure and the appended claims to the invention the essence of which is that there has been provided an erosion protection and seed germination system composed essentially of a permeable plastic film or fabric having on one side thereof an adhesive or gum retaining to the fabric a seed and in one preferred form at least one of a nutrient and filler and having on the other side thereof, in another preferred form, a dilute asphalt emulsion wash, the permeable fabric used being of such a character and so treated as to permit germination and growth of seed therethrough without necessity for removing at any time the thus treated film of fabric.

We claim:

1. A seed germination structure which is protectant against soil erosion comprising a moisture permeable plastic degradable polyolefin fabric having an asphalt coating thereon in a quantity sufficient to coat the fibers of said fabric without rendering said structure water impermeable having on at least one side thereof seed retained thereto by a suitable adhesive material.

2. A structure according to claim 1 which contains a carbon black.

3. A structure according to claim 1 wherein the structure is composed of a non-woven polypropylene fabric having the seed retained on one side thereof by a water soluble gum and having on the other side thereof a dilute asphalt emulsion wash applied asphalt coating.

4. A structure according to claim 1 wherein said fabric is a non-woven polypropylene fabric, said fabric is coated only on one side with said adhesive, said adhesive being water soluble and containing seed desired to germinate and is coated on the other side thereof with an asphalt emulsion wash.

5. A structure according to claim 4 wherein the adhesive is carboxymethylcellulose and the coating contains a dark pigment.

6. A structure according to claim 1 wherein there is contained in the structure an anti-degradation protectant in an amount effective to regulate to a desired extent the degradation thereof.

7. A structure according to claim 1 wherein the fabric is non-woven polypropylene fabric which has been substantially coated with asphalt but only to an extent as to leave pin holes through which light can be observed.

References Cited

UNITED STATES PATENTS

| | | | |
|---|---|---|---|
| 1,931,248 | 10/1933 | Bryant | 47—9 |
| 1,971,504 | 8/1934 | Pratt | 47—56 |
| 2,192,939 | 3/1940 | Slayter et al. | 47—58 |
| 2,648,165 | 8/1953 | Nestor | 47—56 |
| 3,080,681 | 3/1963 | Merrill et al. | 47—56 |
| 3,160,986 | 12/1964 | Watson et al. | 47—56 |
| 3,320,695 | 5/1967 | Moore | 47—9 |

ROBERT E. BAGWILL, Primary Examiner

U.S. Cl. X.R.

47—9